United States Patent
Bradshaw

(10) Patent No.: US 10,694,577 B1
(45) Date of Patent: Jun. 23, 2020

(54) SYSTEM FOR ELECTRONIC ACQUISITION COMPILATION, AND DISTRIBUTION OF LEGAL INFORMATION USING A MOBILE DEVICE

(71) Applicant: Dana Bradshaw, Cypress, TX (US)

(72) Inventor: Dana Bradshaw, Cypress, TX (US)

(*) Notice: Subject to any disclaimer, the term of this patent is extended or adjusted under 35 U.S.C. 154(b) by 0 days.

(21) Appl. No.: 16/594,177

(22) Filed: Oct. 7, 2019

(51) Int. Cl.
| | |
|---|---|
| H04M 11/00 | (2006.01) |
| H04W 76/50 | (2018.01) |
| G08B 25/01 | (2006.01) |
| H04W 4/90 | (2018.01) |
| H04M 1/725 | (2006.01) |
| H04M 3/51 | (2006.01) |

(52) U.S. Cl.
CPC .......... *H04W 76/50* (2018.02); *G08B 25/016* (2013.01); *H04M 1/72538* (2013.01); *H04M 1/72541* (2013.01); *H04M 3/5116* (2013.01); *H04W 4/90* (2018.02); *H04M 2250/10* (2013.01); *H04M 2250/52* (2013.01)

(58) Field of Classification Search
CPC ... H04W 76/50; H04W 4/90; H04M 1/72541; H04M 1/72538; H04M 3/5116; H04M 2250/10; H04M 2250/52; G08B 25/016

USPC ...................................................... 455/404.1
See application file for complete search history.

(56) References Cited

U.S. PATENT DOCUMENTS 9,246,898 B2 * 1/2016 McKeeman ........ H04L 63/0853

* cited by examiner

*Primary Examiner* — Amancio Gonzalez
(74) *Attorney, Agent, or Firm* — The Rapacke Law Group, P.A.

(57) ABSTRACT

A system for the electronic acquisition, compilation, and distribution of legal information, comprising an application, comprising software, which is configured to be downloaded to a mobile device of a user is disclosed. The application is configured to enable the user to indicate a situation to a legal information processing system configured to transmit a plurality of legal information correlated to the indicated situation. The system may automatically connect a microphone and a camera are each associated with the mobile device and in operable communication with the application to permit the user to record and store audio and video data via a database in operable communication with the application.

20 Claims, 4 Drawing Sheets

SYSTEM FOR ELECTRONIC ACQUISITION COMPILATION, AND DISTRIBUTION OF LEGAL INFORMATION USING A MOBILE DEVICE

TECHNICAL FIELD

The embodiments generally relate to systems for providing information and managing communications over a network, and, more specifically, relate to systems for informing users and facilitating communication during an emergency situation or law enforcement interaction.

BACKGROUND

Often, those involved in a vehicular accident or other emergency situation may be too distraught or overwhelmed in the moment to execute the appropriate actions, such as collecting insurance information and taking photographs of the accident scene. Similarly, other emergencies may require those involved to contact an appropriate emergency service or issue a statement to law enforcement. Consequently, many victims may lose the ability to obtain adequate compensation for the harm to their persons and property caused by the accident.

Damage arising from emergency situations or law enforcement interactions may be mitigated when those persons involved act in an appropriate manner. For example, during an interaction with a police officer, a civilian may not know how to interact with other parties, and likewise a police officer may be unsure how to proceed under the given circumstances. Further, the person may not know who to contact in a particular situation such as a doctor, family member, or insurance carrier.

During stressful situations such as those described above, the memory of persons involved may be skewed, or details of the situation may be forgotten entirely. The omnipresence of mobile devices provides a means for collecting information in the forms of audio and video during such situations.

SUMMARY OF THE INVENTION

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

The embodiments disclosed herein provide a system for the electronic acquisition, compilation, and distribution of legal information, comprising an application and accompanying software, which are configured to be downloaded to a mobile device of a user. The application is designed to enable the user to indicate a situation to a legal information processing system and transmit a plurality of legal information correlated to the indicated situation. A microphone and a camera are each associated with the mobile device and in operable communication with the application to permit the user to record and store audio and video data via a database in operable communication with the application to inform the user of possible courses of action from a plurality of pre-programmed responses.

The system may be utilized in various situations including emergencies, such as vehicular accidents, or during interactions with law enforcement, such as a traffic stop. The user indicates the situation type, which will result in information being provided to the user on their mobile device to guide them through interactions and proceedings that may arise during the corresponding user-indicated situation.

In one aspect, the legal information processing system determines at least one of a plurality of responses to the indicated situation and provides the at least one of the plurality of pre-programmed responses on a user interface of the mobile device.

In one aspect, an emergency information processing system is in operable communication with the legal information processing system to access emergency information and distribute emergency information to the user via the mobile device.

In one aspect, at least one of a plurality of third parties are in communication with the user via a network. The third parties are capable of receiving the audio and video data stored in the database. Third parties may include at least one of the following: a law enforcement agency, an insurance provider, at least one attorney, a government agency, and an emergency service provider.

In one aspect, a GPS is provided and is in operable communication with the mobile device to determine the location of the user at the time of the indicated situation.

In one aspect, the GPS system is utilized to determine suitable third parties to contact based on the location of the user at the time of the indicated situation.

In another aspect, a method for distributing information correlated to a situation is disclosed comprising the steps provided by an application and further comprising software, which may be configured to be performed on a mobile device of a user. A user then indicates a situation which is transmitted by the server to a legal information processing system configured to correlate a plurality of legal information to the indicated situation and transmit the correlated information to the user interface.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

Figure 1:
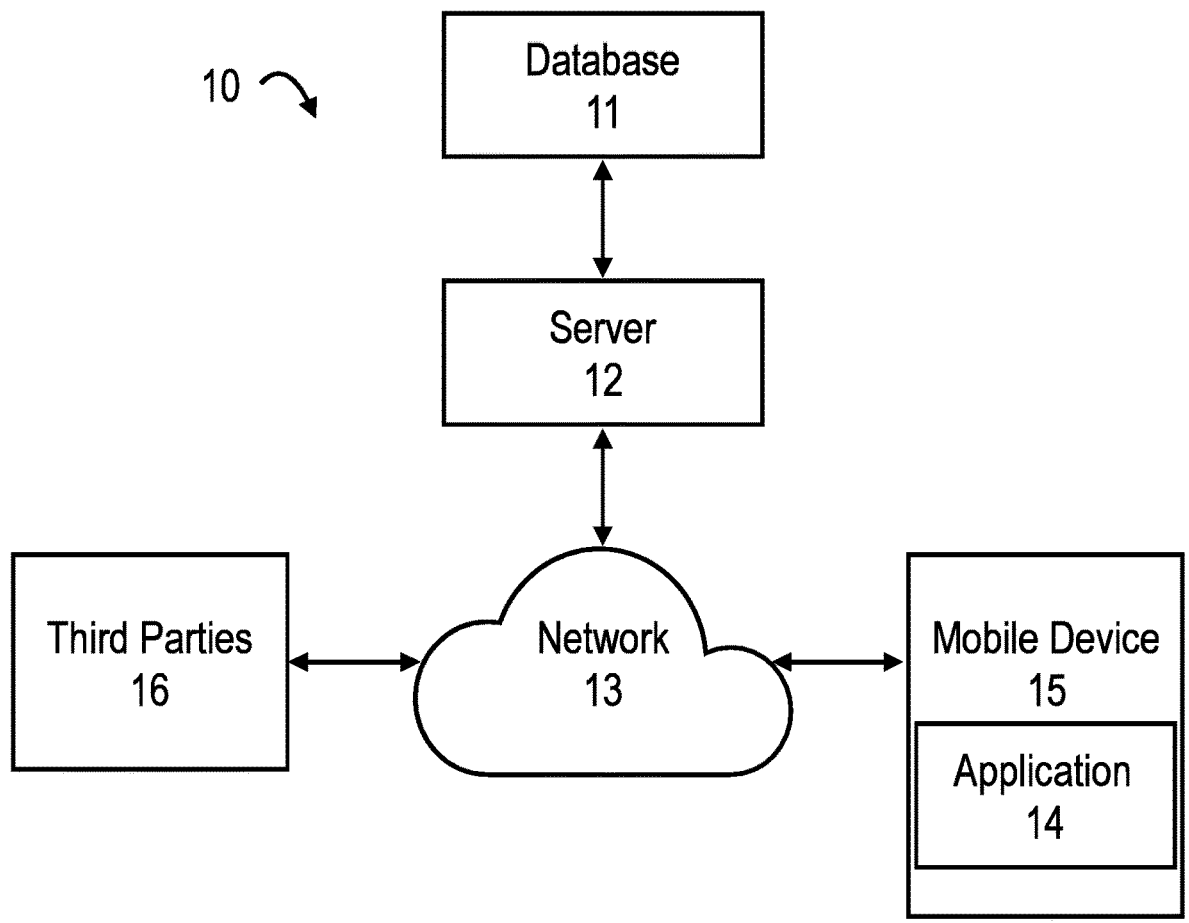
FIG. 1 illustrates a block diagram of the system, according to some embodiments.

The specific details of the single embodiment or variety of embodiments described herein are to the described system and methods of use. Any specific details of the embodiments are used for demonstration purposes only, and no unnecessary limitations or inferences are to be understood therefrom.

Before describing in detail exemplary embodiments, it is noted that the embodiments reside primarily in combinations of components and procedures related to the system. Accordingly, the system components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In general, the embodiments described herein relate to an emergency information and communication system, which may be utilized by various users involved in a emergency situations or during interactions with law enforcement.

In some embodiments, the system may be particularly useful during interaction with law enforcement to instruct the user of how to engage with the police officer during or at any time following the interaction. For example, the system may be utilized during a traffic stop to instruct the user of the procedure of the interaction. Further, the system may be utilized to capture audio and video recordings of the interaction which may be stored in the database and retrieved from the database at a later time via the server. In the above example, the user opens the mobile application via their mobile device to begin operating the system. The user may input the current situation into the system, which places a request to the server to transmit information from the database related to the particular situation. For example, the user may input "Speeding Ticket" which will prompt the server to transmit information related to police interactions during a traffic stop, such as to have their driver's license, registration, and/or proof of insurance ready to present, to turn off the vehicle, to roll down their window, etc. One skilled in the arts will readily understand that the information transmitted may change depending on the legal jurisdiction in which the user is located. In such, the user's location may be indicated, either manually by the user or automatically by a GPS system, when the server is prompted.

In reference to FIG. 1, the system 10 is disclosed comprising an application 14 which is provided to a user interface of a mobile device 15 for receiving, transmitting, and storing information related to the system 10. A database 11 and a server 12 are connected through a network 13 with the mobile device 15 and a plurality of third parties 16. The third parties 16 may include an emergency service, an attorney or group of attorneys, an emergency contact list, contacts stored in the mobile device 15 of the user, an insurance agency or company, the Department of Motor Vehicles, a family member, a law firm or other legal group, or other persons or entities from whom the user may receive some benefit by contacting during an emergency or law enforcement interaction.

In the event of an emergency or law enforcement interaction, a user begins by loading the application 14 from the server 12 onto the user interface of the mobile device 15. The server 12 stores a computer program for assisting in the acquisition process of situation related information. The computer program provides the application 14 with a set of instructions for providing information to the user depending on the user-indicated scenario, such as a vehicular accident or a traffic stop by a police officer.

Figure 2:
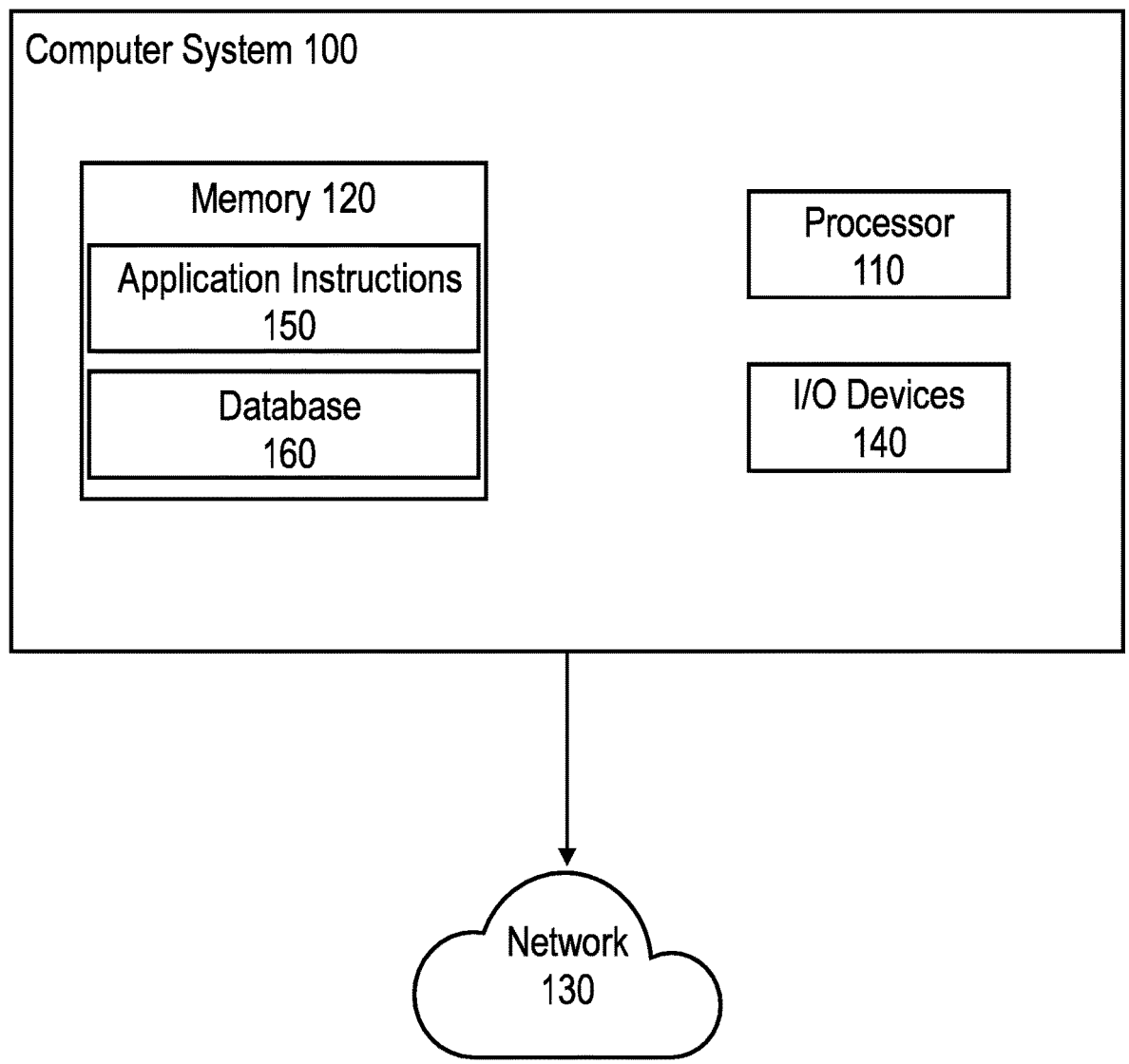
FIG. 2 illustrates a block diagram of an exemplary computing system, according to some embodiments.

FIG. 2 illustrates a computer system 100, which may be utilized to execute the processes described herein. The computing system 100 may be comprised of a standalone computer, a mobile computing device, a mainframe computer system, a workstation, a network computer, a desktop computer, a laptop. The computer system 100 includes one or more processors 110 coupled to a memory 120 via an input/output (I/O) interface. Computer system 100 may further include a network interface to communicate with the network 130. One or more input/output (I/O) devices 140, such as video device(s) (e.g., a camera), audio device(s), and display(s) are in operable communication with the computer system 100. In some embodiments, similar I/O devices 140 may be separate from computer system 100 and may interact with one or more nodes of the computer system 100 through a wired or wireless connection, such as over a network interface.

Processors 110 suitable for the execution of a computer program include both general and special purpose microprocessors and any one or more processors of any digital computing device. The processor 110 will receive instructions and data from a read-only memory or a random-access memory or both. The essential elements of a computing device are a processor for performing actions in accordance with instructions and one or more memory devices for storing instructions and data. Generally, a computing device will also include, or be operatively coupled to receive data from or transfer data to, or both, one or more mass storage devices for storing data, e.g., magnetic, magneto-optical disks, or optical disks; however, a computing device need not have such devices. Moreover, a computing device can be embedded in another device, e.g., a mobile telephone, a personal digital assistant (PDA), a mobile audio or video player, a tablet, a laptop, a desktop computer, a game console, a Global Positioning System (GPS) receiver, or a portable storage device (e.g., a universal serial bus (USB) flash drive).

A network interface may be configured to allow data to be exchanged between the computer system 100 and other devices attached to a network 130, such as other computer systems, or between nodes of the computer system 100. In various embodiments, the network interface may support communication via wired or wireless general data networks, such as any suitable type of Ethernet network, for example, via telecommunications/telephony networks such as analog voice networks or digital fiber communications networks, via storage area networks such as Fiber Channel SANs, or via any other suitable type of network and/or protocol.

The memory 120 may include application instructions 150, configured to implement certain embodiments described herein, and a database 160, comprising various data accessible by the application instructions 150. In one embodiment, the application instructions 150 may include software elements corresponding to one or more of the various embodiments described herein. For example, application instructions 150 may be implemented in various embodiments using any desired programming language, scripting language, or combination of programming languages and/or scripting languages (e.g., C, C++, C #, JAVA®, .NET, SGC, JAVASCRIPT®, PERL®, etc.).

The steps and actions of the computer system 100 described in connection with the embodiments disclosed herein may be embodied directly in hardware, in a software module executed by a processor, or in a combination of the two. A software module may reside in RAM, flash memory, ROM memory, EPROM memory, EEPROM memory, registers, a hard disk, a removable disk, a CD-ROM, or any other form of storage medium known in the art. An exemplary storage medium may be coupled to the processor 110 such that the processor 110 can read information from, and write information to, the storage medium. In the alternative, the storage medium may be integrated into the processor 110. Further, in some embodiments, the processor 110 and the storage medium may reside in an Application Specific Integrated Circuit (ASIC). In the alternative, the processor and the storage medium may reside as discrete components in a computing device. Additionally, in some embodiments, the events or actions of a method or algorithm may reside as one or any combination or set of codes and instructions on a machine-readable medium or computer-readable medium, which may be incorporated into a computer program product.

Also, any connection may be associated with a computer-readable medium. For example, if the software is transmitted from a website, server, or other remote source using a coaxial cable, fiber optic cable, twisted pair, digital subscriber line (DSL), or wireless technologies such as infrared, radio, or microwave, then the coaxial cable, fiber optic cable, twisted pair, DSL, or wireless technologies such as infrared, radio, or microwave are included in the definition of medium. "Disk" and "disc," as used herein, include compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

In some embodiments, the system is world-wide-web (www) based, or other web network based, and the network server is a web server delivering HTML, XML, etc., web pages to the computing devices. In other embodiments, a client-server architecture may be implemented, in which a network server executes enterprise and custom software, exchanging data with custom client applications running on the computing device.

Figure 3:
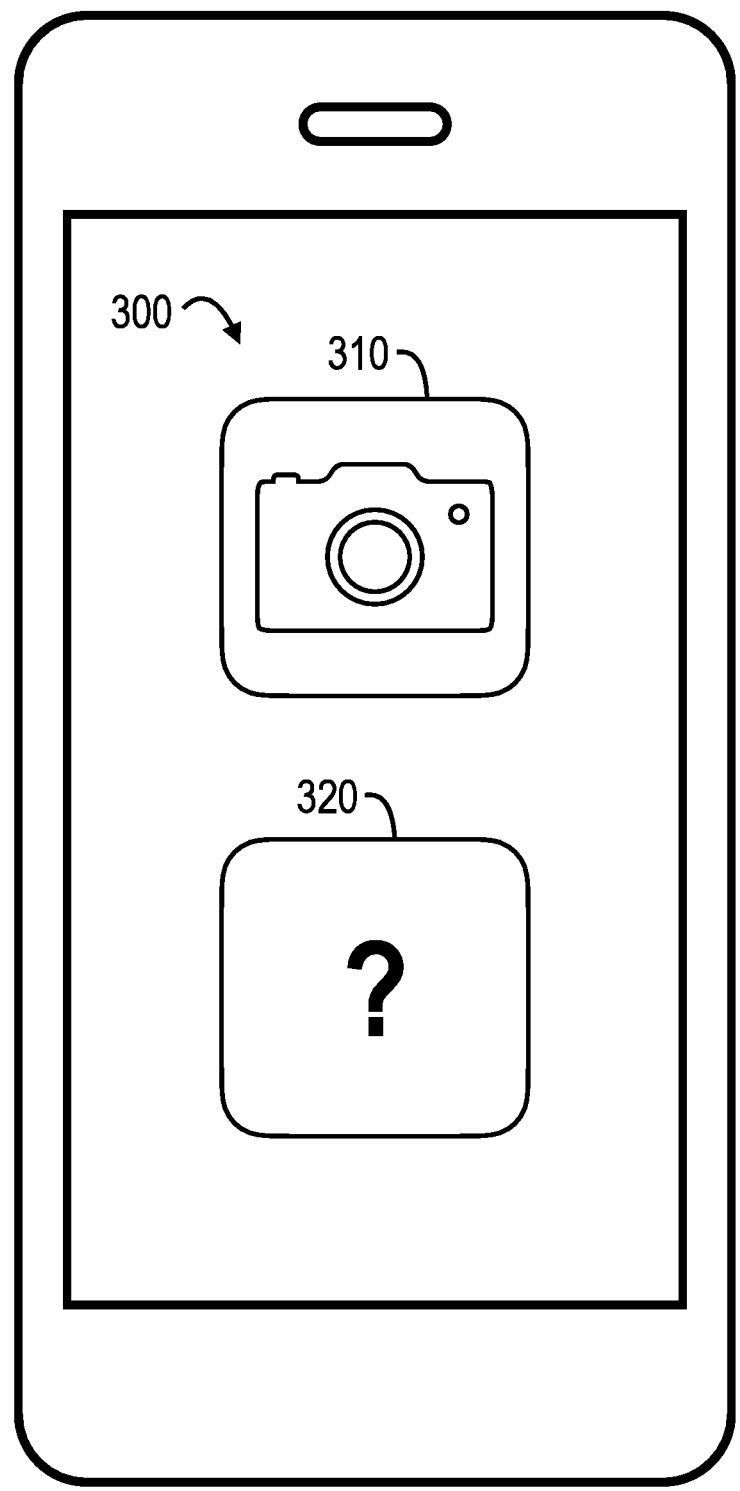
FIG. 3 illustrates a screenshot of the home screen provided on the user interface of the mobile device, according to some embodiments.

FIG. 3 illustrates an exemplary "home screen" of a user interface 300 provided on the mobile device. One skilled in the arts will readily understand that the selectable tabs may be altered depending on the application of the system. In the illustrated example, the plurality of selectable tabs includes a "record" tab 310 and an "inquiry" tab 320. The record tab 310 permits the application to access the audio/video recording devices associated with the mobile device, such as the embedded camera, an automobile camera, or other camera system associated with the device or the vehicle. The user may then record the situation, the recording of which is transmitted to the database. The inquiry tab 320 provides an interface wherein the user may submit an inquiry for information which is transmitted to the legal information processing system or an emergency information processing system as described herein. The inquiry, for example, may be a request for legal information related to particular police interactions such as the interaction between a vehicle operator and a police officer during a traffic stop.

Figure 4:
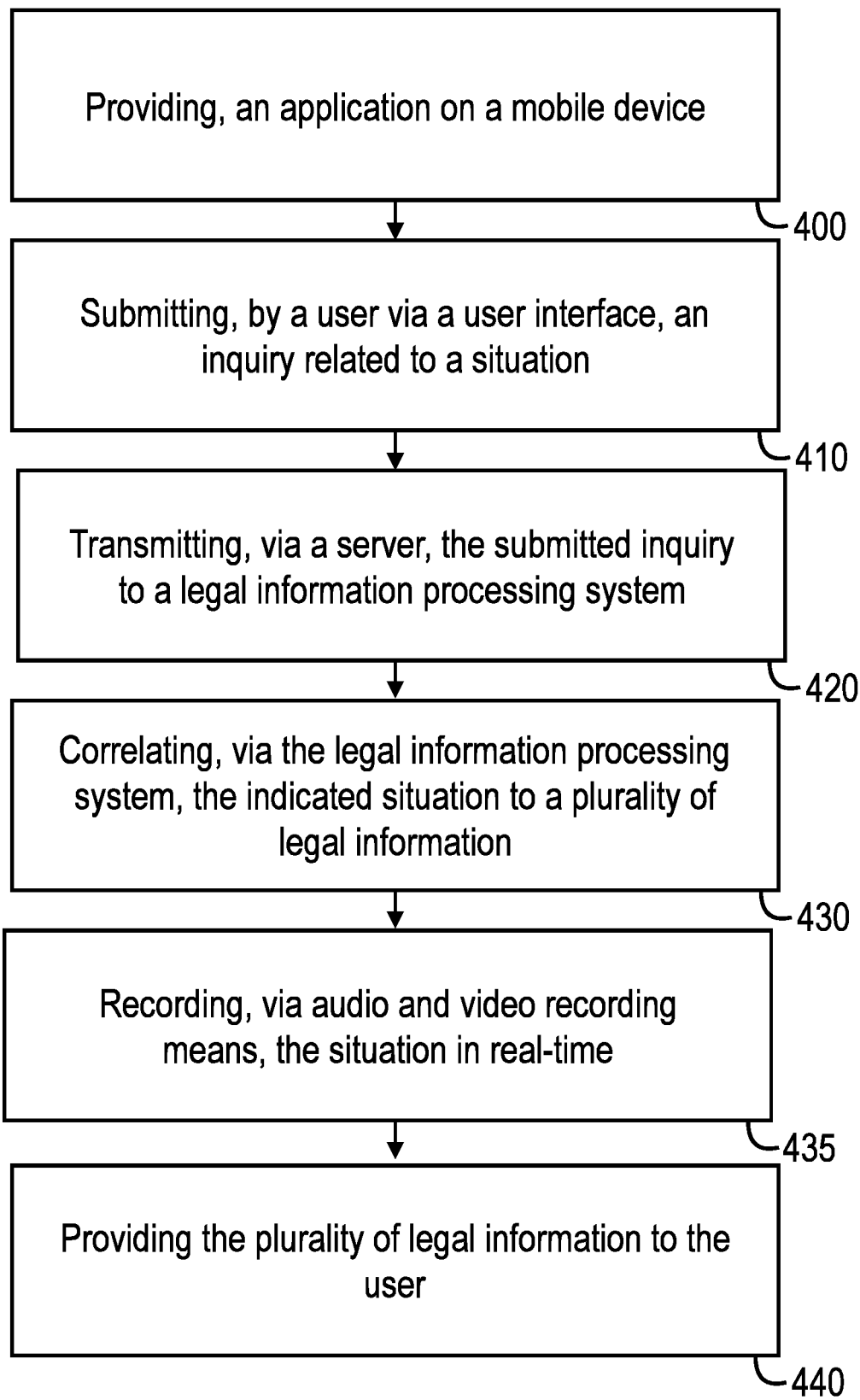
FIG. 4 illustrates a flowchart of a process for providing information related to a situation, according to some embodiments.

FIG. 4 illustrates an exemplary flowchart for a process of distributing information related to a situation, such as an emergency situation or police interaction. In step 400, an application is provided on a user interface of a mobile device to permit a user to submit an inquiry related to a situation in step 410. The user indicates the situation, such as by selecting or typing "Speeding Ticket," and the server transmits the inquiry to the legal information processing system in step 420. In some embodiments, the user may select to call a contact on their contact list stored on their mobile device or a contact list stored by the database of the system. In step 430, the legal information processing system correlates the indicated situation to a plurality of legal information and the system records, via audio and video recording means, the situation in real-time in step 435. In step 440, the user is provided with legal information from the information processing system.

In some embodiments, an emergency information processing system is provided to allow the user to indicate an emergency situation. The emergency information processing system may then correlate the indicated situation to a plurality of emergency information which is distributed to the user via the user interface.

In some embodiments, the user interface may be utilized to input information including a plurality of names, locations, vehicle identification numbers, license plate numbers, witness information, passenger information, image information (which may include images of the accident scene or images of the environment within which the emergency or police interaction occurs), injuries received or witnessed, witness statements, victim statements, police statements, and other relevant information to the particular emergency or police interaction.

Many different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. A system for the electronic acquisition, compilation, and distribution of legal information, the system comprising:
   an application, comprising software, configured to be downloaded to a personal mobile device of a user, the application configured to enable the user to indicate a situation to a legal information processing system configured to transmit a plurality of legal information correlated to the indicated situation; and
   a microphone and a camera associated with the mobile device and in operable communication with the application to permit the user to record and store audio and video data via a database in operable communication with the application;
   wherein the legal information processing system determines a plurality of responses to the indicated situation.

2. The system of claim 1, further comprising an emergency information processing system in operable communication with the legal information processing system.

3. The system of claim 2, further comprising a plurality of third parties in communication with the user via a network, the third parties capable of receiving the audio and video data stored in the database.

4. The system of claim 3, wherein the third parties include at least one of the following: a law enforcement agency, an insurance provider, at least one attorney, a government agency, and an emergency service provider.

5. The system of claim 4, further comprising a GPS in operable communication with the mobile device, the GPS operable to determine the location of the user at the time of the indicated situation.

6. The system of claim 5, wherein the GPS system determines suitable third parties to contact based on the location of the user at the time of the indicated situation.

7. The system of claim 1, wherein the personal mobile device comprises:
   a mobile telephone;
   a personal digital assistant (PDA);
   a mobile audio or video player;
   a tablet;
   a laptop;
   a game console;
   a Global Positioning System (GPS) receiver; or
   a portable storage device (flash drive).

8. A computing system for the electronic acquisition, compilation, and distribution of legal information, the system comprising:
   a standalone computer, a mobile computing device, a mainframe computer system, a workstation, a network computer, a desktop computer or a laptop, including one or more processors coupled to a memory via an input/output (I/O) interface;
   an application, comprising software, configured to be downloaded to a personal mobile device of a user, the application configured to enable the user, via a user interface, to indicate a situation to a legal information processing system configured to correlate a plurality of legal information to the indicated situation and transmit the correlated information to the user interface;
   further comprising a microphone, an audio device, a display and a camera associated with the mobile device and in operable communication with the application to permit the user to record and store audio and video data via a database in operable communication with the application;
   wherein the legal information processing system determines a plurality of responses to the indicated situation.

9. The system of claim 8, further comprising an emergency information processing system in operable communication with the legal information processing system.

10. The system of claim 9, further comprising a plurality of third parties in communication with the user via a network, the third parties capable of receiving the audio and video data stored in the database.

11. The system of claim 10, wherein the third parties include at least one of the following: a law enforcement agency, an insurance provider, at least one attorney, a government agency, a family member, and an emergency service provider.

12. The system of claim 11, further comprising a GPS in operable communication with the mobile device, the GPS operable to determine the location of the user at the time of the indicated situation.

13. The system of claim 12, wherein the GPS system determines suitable third parties to contact based on the location of the user at the time of the indicated situation.

14. The computing system of claim 8, comprising:
   a standalone computer;
   a mobile computing device;
   a mainframe computer system;
   a workstation; a network computer;
   a desktop computer; or
   a laptop.

15. A method for distributing information correlated to a situation, the method comprising the steps of:
   providing an application, comprising software, configured to be downloaded to a mobile device of a user;
   indicating, by a user via a user interface provided on the mobile device, a situation;
   transmitting, via a server, the indicated situation to a legal information processing system configured to correlate a plurality of legal information to the indicated situation;
   determining by the legal information processing system a plurality of responses to the indicated situation, and
   transmitting the correlated information and plurality of responses to the user interface to inform the user of possible courses of action.

16. The method of claim 15, further comprising a microphone and a camera associated with the mobile device.

17. The method of claim 16, wherein the microphone and the camera permit the user to record and store audio and video data via a database in operable communication with the application.

18. The method of claim 17, further comprising a GPS in operable communication with the mobile device, the GPS operable to determine the location of the user at the time of the indicated situation.

19. The method of claim 18, wherein the GPS system determines suitable third parties to contact based on the location of the user at the time of the indicated situation.

20. The method of claim 19, further comprising an emergency information processing system in operable communication with the legal information processing system.

* * * * *